(12) United States Patent
Ward et al.

(10) Patent No.: US 12,483,621 B2
(45) Date of Patent: Nov. 25, 2025

(54) MAPPING CRYPTOGRAPHIC KEYS TO DISTRIBUTED LEDGER SHARDS

(71) Applicant: Uvue Ltd., Bury St Edmunds (GB)

(72) Inventors: Jonathan Ward, Bury St Edmunds (GB); James Riehl, Bury St Edmunds (GB)

( * ) Notice: Subject to any disclaimer, the term of this patent is extended or adjusted under 35 U.S.C. 154(b) by 545 days.

(21) Appl. No.: 17/996,163

(22) PCT Filed: Apr. 16, 2021

(86) PCT No.: PCT/IB2021/053155
§ 371 (c)(1),
(2) Date: Oct. 13, 2022

(87) PCT Pub. No.: WO2021/209966
PCT Pub. Date: Oct. 21, 2021

(65) Prior Publication Data
US 2023/0254370 A1   Aug. 10, 2023

(30) Foreign Application Priority Data

Apr. 17, 2020  (EP) .................................... 20020184
Sep. 7, 2020   (EP) .................................... 20020399

(51) Int. Cl.
*H04L 67/10* (2022.01)
*H04L 9/30* (2006.01)
(Continued)

(52) U.S. Cl.
CPC ............ *H04L 67/1097* (2013.01); *H04L 9/30* (2013.01); *G06F 9/4881* (2013.01); *G06F 9/5072* (2013.01)

(58) Field of Classification Search
CPC ......... H04L 67/1097; H04L 9/30; H04L 9/50; H04L 2209/56; H04L 9/3236; G06F 9/4881; G06F 9/5072
See application file for complete search history.

(56) References Cited

U.S. PATENT DOCUMENTS

2018/0167217 A1\* 6/2018 Brady ..................... H04L 67/10
2019/0140935 A1\* 5/2019 Kikinis ................... G06F 30/20
(Continued)

OTHER PUBLICATIONS

"OKChain Whitepaper", published in Ok Institude of Blockchain Engineering, dated Dec. 12, 2018, 12 pages.
(Continued)

*Primary Examiner* — Benjamin C Wu
(74) *Attorney, Agent, or Firm* — RC Trademark Company

(57) ABSTRACT

Disclosed is a distributed computer system that includes a plurality of worker nodes that are coupled together via a data communication network to exchange data therebetween, wherein computation by the worker nodes is managed within the distributed computer system. The distributed computer system configured to implement a scheme for mapping cryptographic keys to a specific shard in the distributed ledger arrangement that can be modified by a user worker node and an operator worker node of the distributed ledger arrangement; employ a pricing mechanism for specifying transaction costs that incentivizes user worker nodes to submit transactions that are restricted to a single shard; adopt algorithms specifying internal logic for wallet software that access shards so as to minimise their transaction costs; and execute procedures for reorganizing state databases when shards are duplicated or merged so that subsequent transactions can be maximally executed in parallel.

15 Claims, 2 Drawing Sheets

(51) Int. Cl.
  *H04L 67/1097* (2022.01)
  *G06F 9/48* (2006.01)
  *G06F 9/50* (2006.01)

(56) References Cited

U.S. PATENT DOCUMENTS

| | | |
|---|---|---|
| 2020/0026548 A1 | 1/2020 | Huang |
| 2021/0083882 A1* | 3/2021 | Venable, Sr. .......... H04L 9/3268 |
| 2021/0119781 A1* | 4/2021 | Liu .......................... H04L 9/085 |
| 2021/0303633 A1* | 9/2021 | Irazabal .............. G06F 16/9014 |
| 2022/0038273 A1* | 2/2022 | Lee ....................... H04L 9/3247 |
| 2023/0029053 A1* | 1/2023 | Manuel-Devadoss ...................... H04L 9/0825 |
| 2023/0177496 A1* | 6/2023 | Le Van Gong .... G06Q 20/3829 |

OTHER PUBLICATIONS

Woo et al., published "GARET: improving throughput using gas consumption-aware relocation in Ethereum sharding environments", in Cluster Computing, vol. 23, dated Mar. 18, 2020, pp. 2235-2247.

Extended European Search Report issued in European EP Patent Application No. EP20020399.0 on Feb. 10, 2021, 32 pages.

Notification of transmittal of the International Search Report and Written Opinion of the International Searching Authority issued in International Patent Application No. PCT/IB2021/053155 on Jul. 22, 2021, 15 pages.

* cited by examiner

MAPPING CRYPTOGRAPHIC KEYS TO DISTRIBUTED LEDGER SHARDS

TECHNICAL FIELD

The present disclosure relates generally to systems for managing information related to recordal of entries in a distributed ledger; and more specifically, to methods and systems for distributed computer systems that enable parallel recordal of entries in a distributed ledger thereby maximizing throughput thereof.

BACKGROUND

Decentralized ledgers make it possible for large numbers of individual entities that are unknown to each other to transact quickly, securely, and reliably. Transactions generally include any digitally encoded information of value and can be as simple as a one-way transfer or arbitrarily complex. The key enabling technology is blockchain consensus, which relies on carefully designed data structures and algorithms along with cryptography to achieve provable guarantees of performance and security. A critical problem with most existing block chain ledgers is that they are severely limited in the number of transactions they can process in a given amount of time. One particularly promising solution to this problem is parallelization or sharding (i.e. a partition of data). A major issue facing many existing Decentralized Ledger Technologies (DLTs), more popularly known as blockchains, is their limited throughput. This arises because of their serial architecture, which causes bottlenecks in the rate at which transactions can be communicated, executed and accessed from local databases.

In order to improve the scalability of the distributed ledger, methods such as off-chain protocols and Directed Acyclic Graph (DAG) based blockchains and sharded blockchains have been proposed. A well-known approach to this problem, known as sharding, is to divide the transactions into groups that allow these different processes to be performed in parallel on different machines. Sharding, implements parallelization by dividing validators that verify transactions into different groups and processing different transactions in each shard.

Similar to sharding in databases, which has long been used to increase the efficiency of data storage, sharding in decentralized ledgers involves decomposing the ledger into smaller groups, known as shards, and processing transactions on different shards in parallel. But factors inherent to blockchains present some additional challenges to sharding implementation. First, the various stakeholders may have different and even competing objectives that impact the performance of the sharded ledger. For example, it is in the interest of agents transacting on the ledger that transactions are fast and cheap, which will occur when congestion is low, but miners and validators benefit when transactions are expensive, which may be the case when congestion is high. These different incentives must be accounted for in the design of an efficient sharding system for blockchain ledgers.

The sharding of databases has a long history and has been developed in many different directions. The most important distinction between blockchains and conventional databases is that the blockchain and its users involve many different stakeholders, who have varying and sometimes competing objectives on the blockchain. For example, the agents/wallets are interested in exchanging resources securely, quickly, but miners/validators would prefer to validate fewer transactions which could be at higher cost. These incentives must be considered in the design of an effective sharding implementation for blockchain ledgers. If the load on each shard is imbalanced, sharding protocols have the following issues: due to the load imbalance, the hardware specs required for the validator will be higher than when the load is balanced. This prevents new validators from entering.

Several methods for sharding block chains have been put forth, each of which proposes to make the ledgers more scalable while maintaining appropriate levels of security. However, these methods all rely on randomization for distribution among shards and do little to explicitly mitigate the problems of load imbalance and frequent cross-shard transactions.

SUMMARY

The present disclosure seeks to provide a distributed computer system that includes a plurality of worker nodes that are coupled together via a data communication network to exchange data therebetween, wherein computation by the worker nodes is managed within the distributed computer system. The present disclosure seeks to provide, in the aforementioned distributed computer system and enables parallel execution of transactions in a distributed ledger arrangement, maximising throughput thereof.

The distributed computer system and the method provided in the present disclosure ensures increased transaction throughput in decentralized ledgers. Notably, implementation of the system described herein requires only a few simple and fast computations based on readily available transaction history. Furthermore, the distributed computer system enables fully decentralized optimization of transaction execution.

In one aspect, there is provided A distributed computer system that includes a plurality of worker nodes that are coupled together via a data communication network to exchange data therebetween, wherein the worker nodes are configured to process data therein, wherein operation of the distributed computer system is coordinated by employing a distributed ledger arrangement, wherein the distributed computer system is configured to execute at least one smart contract via use of the distributed ledger arrangement, wherein the distributed computer system further comprises a scheme for mapping cryptographic keys to a specific shard in the distributed ledger arrangement such that the scheme can be modified by a user worker node and/or an operator worker node of the distributed ledger arrangement; a pricing mechanism, for specifying a transaction cost, such that it maximises system throughput by incentivising user worker nodes to submit transactions that are restricted to a single shard, algorithms for specifying internal logic for wallet software that accesses shards such that the transaction cost is minimised; and wherein the distributed computer system is configured to execute procedures for reorganizing state databases when shards are duplicated or merged, such that subsequent transactions are maximally executed in parallel.

Optionally, for each shard, the scheme for mapping cryptographic keys is configured to employ an index that maps a public key to a specific shard and to employ an account index that allows a single public key to map to different addresses within a same shard.

The system may further comprise a wallet software configured to track changes within a block when a transaction is submitted, wherein each of the shards keeps a record of the merging and splitting operations that have been applied to it. Optionally, the wallet software is configured to compute probabilities of transactions being assigned to particular shards during splitting operations to decrease the average number of queries that are required.

Optionally, the distributed computer system is configured to provide a permission to validators of the distributed ledger arrangement to modify account indices.

Optionally, the distributed computer system is configured to arrange for optimal distribution of transactions between shards such that cross-shard transaction is disincentivised. Wherein each of the shards have a predefined congestion threshold, the system is configured to split a given shard into two new shards when the given shard reaches the predefined congestion threshold.

In another aspect, there is provided a method for operating a distributed computer system that includes a plurality of worker nodes that are coupled together via a data communication network to exchange data therebetween, wherein the worker nodes are configured to process data therein, wherein operation of the distributed computer system is coordinated by employing a distributed ledger arrangement, wherein the distributed computer system is arranged to execute at least one smart contract via use of the distributed ledger arrangement, characterized in that the method includes
  (a) implementing a scheme for mapping cryptographic keys to a specific shard in the distributed ledger arrangement that can be modified by a user worker node and/or an operator worker node of the distributed ledger arrangement;
  (b) employing a pricing mechanism for specifying transaction computing cost that incentivizes user worker nodes to submit transactions that are restricted to a single shard, thereby maximising system throughput;
  (c) adopting algorithms specifying internal logic for wallet software that access shards such that their transaction computing cost is minimised; and
  (d) executing procedures for reorganizing state databases when shards are duplicated or merged so that subsequent transactions can be maximally executed in parallel.

Optionally, method further comprises employing an index that maps a public key to a specific shard and employing an account index that allows a single public key to map to different addresses within a same shard.

The method may further comprise employing a wallet software configured to keep track of a block when the latest transaction was submitted, wherein each of the shards keeps a record of the merging and splitting operations that have been applied to it. Optionally, the method further comprises computing probabilities (namely arranging for the wallet software to compute probabilities) of transactions being assigned to particular shards during splitting operations to decrease the average number of queries that are required.

Optionally, the method comprises providing a permission to modify account indices to validators of the distributed ledger arrangement.

Optionally, the method further comprises disincentivising cross-shard transaction and arranging for optimal distribution of transactions between shards.

Optionally, wherein each of the shards have a predefined congestion threshold, a given shard splits into two new shards when the given shard reaches the predefined congestion threshold.

The present disclosure also seeks to provide a software product recorded on non-transient machine-readable data storage media, wherein the software product is executable upon computing hardware for implementing a method, including all essential and optional features.

The present disclosure thus addresses the aforementioned problems by providing: (i) a scheme for mapping cryptographic keys to a specific shard in the blockchain that can be modified by both the user and the operators of a blockchain (known as validators or miners depending on the type of consensus that is employed) (ii) a pricing mechanism for specifying transaction costs that incentivizes users to submit transactions that are restricted to a single shard, thereby maximising system throughput, (iii) algorithms specifying internal logic for wallet software that access shards so as to minimise their transaction costs (iv) procedures for reorganizing state databases when shards are duplicated or merged so that subsequent transactions can be maximally executed in parallel. The combination of the pricing scheme, best-responding agent strategy and shard merging, and division algorithms enable the blockchain to act as a decentralized system that self-organizes to optimize throughput.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
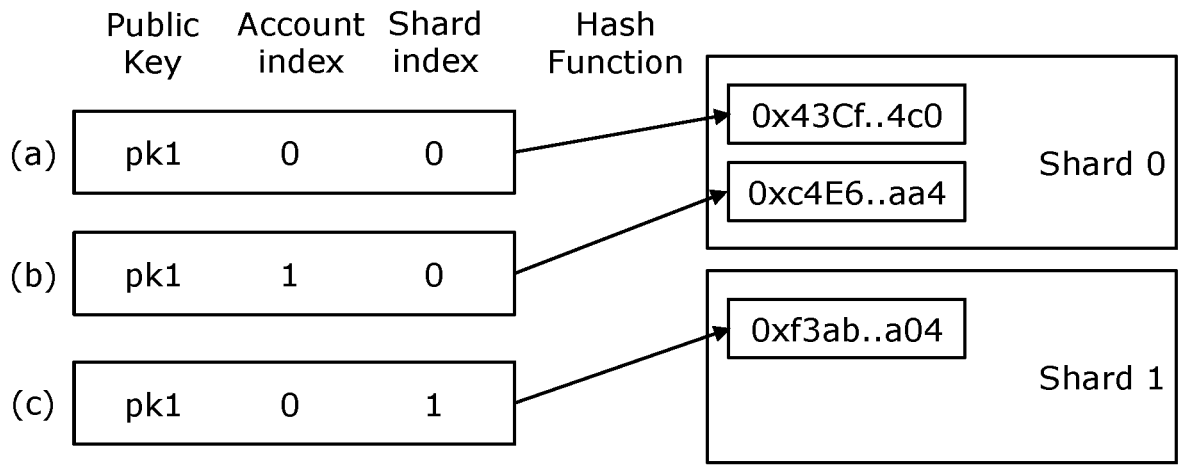
FIG. 1 is a block diagram illustrating a shard indexing scheme, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The distributed computer system and the method provided in the present disclosure ensures increased transaction throughput in decentralized ledgers. Notably, implementation of the system described herein requires only a few simple and fast computations based on readily available transaction history. Furthermore, the distributed computer system enables fully decentralized optimization of transaction execution. Consequently, the increased efficiency and throughput of the system decreases cost of operation of the distributed ledgers and increases validator efficiency. Furthermore, transaction finality times, network traffic and the potential for DDoS attacks is significantly reduces.

In the present disclosure, the word 'cost' refers to 'computing cost', which in turn is defined in respect of physical (measurable) quantities such as the amount of computing power used, speed of processing of computing tasks in a distributed system, use of computing memory, where a more economic use of power and memory for achieving an equivalent result (namely, perform an equivalent computing task) is considered an efficiency improvement. The minimisation of computing cost typically also translate into minimization of energy or time required, or even minimisation of resources (such as water) for cooling the heat produced by processing devices (namely the worker nodes participating in the system). Ultimately, such efficiency improvements or savings should also result in saving of monetary costs.

Furthermore, the worker nodes that are configured to (namely operable to) respond to, and processes instructions and data therein. The worked nodes may comprise a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the worker nodes can be one or more individual processors, processing devices and various elements associated with a processing device that may be shared by other processing devices. Additionally, the worker nodes may be arranged in various architectures for responding to and processing the instructions that drive the system. Optionally, the worker nodes are processing devices that operate automatically or autonomously, the letter being the case in which one or more worker nodes possesses artificial intelligence capabilities. In such regard, the worker nodes may be equipped with artificial intelligence algorithms that responds to and performs the instructions that drive the system based on data learning techniques. The worker nodes may also be processing devices that respond to one or more instructions or performs such instructions based on an input provided from a user (namely, a worker node participating in the system). Furthermore, computation by the worker nodes may be managed within the distributed computer system, for example with respect to the amount of computational power used or available for use. Notably, the computing model is trained between the plurality of worker nodes in a manner that the intermediary computing models that have been partially trained are shared between the worker nodes and resources of worker nodes are utilized productively.

Moreover, the plurality of worker nodes are communicably coupled to each other via the data communication network. The data communication network allows for communication among the plurality of worker nodes. In other words, each of the plurality of worker nodes is capable of communicating with other worker nodes via the data communication network in order to facilitate training of the computing model. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network employs wired or wireless communication that can be carried out via one or more known protocols.

The operation of the distributed computer system is coordinated by employing the distributed ledger arrangement. Herein, the term "distributed ledger arrangement" refers to a ledger (such as a database) comprising entries recording operations and/or contracts, with a timestamp. Pursuant to embodiments of the present disclosure, the distributed ledger arrangement refers to a database of the entries or blocks. Moreover, the distributed ledger arrangement is consensually shared and synchronised in a decentralised form across the plurality of worker nodes. In this regard, the ledger is consensually shared and synchronised across multiple sites, institutions or geographies. Optionally, such worker nodes are established across different locations and operated by different users. Beneficially, the distributed ledger arrangement eliminates the need of a central authority to maintain the distributed ledger arrangement and protect it against manipulation. Specifically, the entries or blocks in the distributed ledger arrangement are monitored publicly, thereby making the distributed ledger arrangement robust against attacks. Notably, the worker nodes may be independent entities that may become a part of the distributed computer system and provide resources thereof in exchange for a reward provided as a compensation for the resources used thereof for training the computing model.

It will be appreciated that the plurality of worker nodes (namely, peers) in the distributed ledger arrangement may access each of the entries in the distributed ledger arrangement and may own an identical copy of each of the entries. It will be appreciated that in the present invention accessing of each of the entries and ownership of, or even access to an identical copy of each of the entries is an option comprised on the present system. Notably, an alteration made to the distributed ledger arrangement is reflected almost instantly to each of the plurality of worker nodes. Subsequently, an addition of an entry is completed when all or some of the plurality of worker nodes perform a validation with respect to the addition. In such case, the entry is recorded (namely, added) in the distributed ledger arrangement in an immutable form when at least a threshold number of worker nodes from the plurality of worker nodes reach a consensus that the entry is valid. Alternatively, recording of the entry or the block is denied when the threshold number of worker nodes reach a consensus that the entry is invalid. In an example, the threshold number of worker nodes to reach a consensus may be more than fifty percent of the plurality of worker nodes. Optionally, information in the distributed ledger arrangement is stored securely using cryptography techniques.

The distributed ledger arrangement is arranged to execute at least one smart contract via use of the distributed ledger arrangement. Herein, the term "smart contract" refers to a computer protocol implemented using the distributed ledger arrangement comprising information required to coordinate the computation by the worker nodes by the distributed computer system. Moreover, the smart contract permits trusted execution thereof without involving a central authority, legal system, or externally enforced mechanisms. Pursuant to the embodiments of the present disclosure, the smart contract is employed to coordinate learning between the worker nodes and to ensure that the learning parameters relating to training of the computing model are provided to the plurality of worker nodes.

The distributed computer system comprises data processing capabilities, which refers to data processing by at least one the nodes participating in the distributed computer system. Notably, the data processing capabilities is an arrangement of the system in which each participating node is communicably coupled to the plurality of worker nodes in the distributed computer system and thus enables tracking the operation of each of the worker nodes by any participating nodes. Furthermore, nodes participating in the system may include, but is not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the nodes may also include one or more individual processors, processing devices and various elements associated with a processing device that may be shared by other processing devices.

The system described herein, is configured to implement a scheme for mapping cryptographic keys to a specific shard in the distributed ledger arrangement that can be modified by a user worker node and an operator worker node of the distributed ledger arrangement. Notably, an important component of the system is the procedure that is used to map public keys to (i) a specific shard in the blockchain and (ii) an address within the shard, wherein, by consequence each shard may be a logically and potentially physically separated database.

The present disclosure uses the standard constructions where users (node has authority to transact or create entry) possess a secret key that allows them to sign transactions and there is a matching public key that is stored on-chain and allows the operators of the network to verify signatures. It is also standard practice for accounts to have a shorter variable known as an address, which is used to reference, for example, the account balance in the blockchain's state database. The address is typically generated by hashing the public key, and in many cases ignoring some of the digits within the hash.

During operation of the blockchain, it might be necessary to duplicate shards to increase execution throughput during periods of high congestion. The inverse merging operation might be applied during quieter periods to reduce the ledger's operating costs. Since each shard incorporates a database, the division of shards might also be necessary to decrease the size of these databases so that they fit easily on a single storage partition or have acceptable read/write times. There are also several other external factors that might promote splitting or merging of shards as described herein later.

The difference between the system described herein and conventional blockchain system is the presence of an index that maps the public key to a specific shard and secondly an account index that allows a single public key to map to different addresses within the same shard. These three elements are serialized and hashed to produce the unique address of the account as shown in FIG. 1.

The two indices are designed to facilitate the movement of addresses between different shards to maximize the parallelism and therefore throughput of a sharded blockchain. This movement would occur under two circumstances; the division of a shard into two sub-shards or the merge of a pair of shards into a single shard. Both cases involve the movement of addresses to a different shard configuration as shown in FIGS. 1 and 2.

Figure 2:
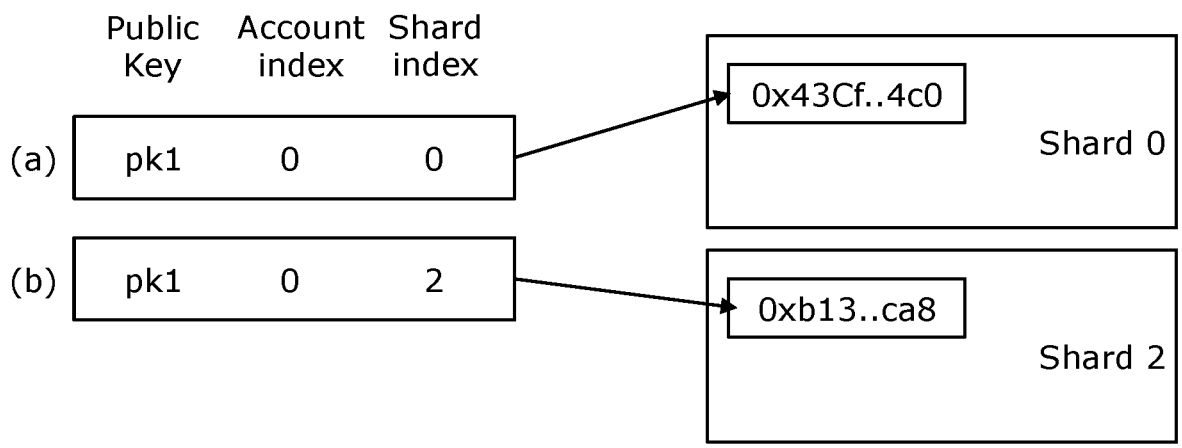
FIG. 2 is a block diagram illustrating a shard division scheme, in accordance with an embodiment of the present disclosure.
Figure 3:
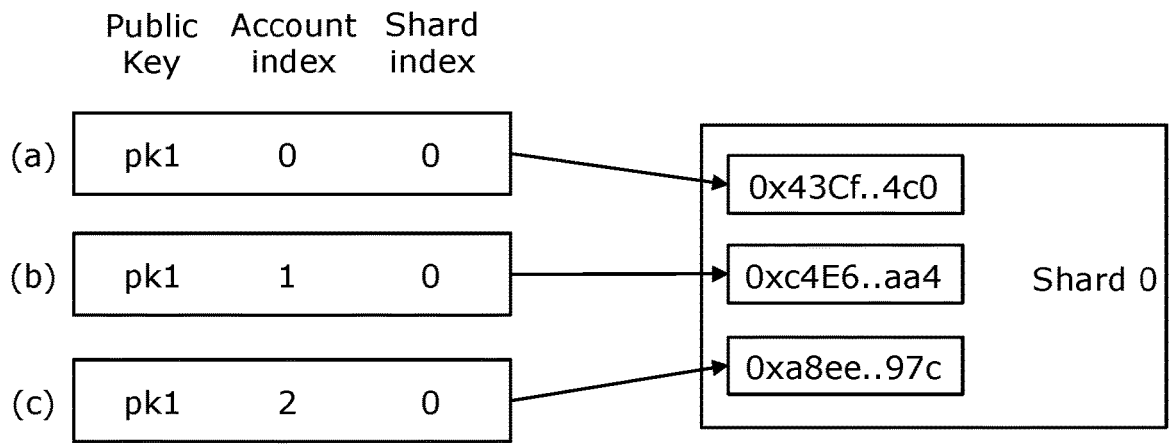
FIG. 3 is a block diagram illustrating a shard merging scheme, in accordance with an embodiment of the present disclosure.

This procedure, as shown in FIGS. 1 to 3, ensures that all of the state is preserved during both divide and merge operations. This would be appropriate, for example, for preserving variables representing state in smart contracts but other rules could be applied in different circumstances. These typically apply to merge operations as described herein below.

Optionally, summation could be applied so that a single, merged state variable represents the sum of the two variables that were present on the parent chains. This is particularly appropriate for variables representing fungible tokenized assets. Other simple arithmetic operations such as subtraction and multiplication could be applied to numerical data. Logical operations such as AND, NOT, OR and more complex logic arising from combination of these operators could be applied. Aggregation or set-intersection could be applied to composite data structures that are referenced in the two parent shards.

Optionally, restriction is imposed on the protocol so that account indices can only be modified by validators. State rent is integrated so that account holdings are decreased over time to cover the cost of maintaining the state on all replicas of the shard. It is also straightforward for an agent to send funds from one shard to another using a cross-shard transaction. This allows the agent to move currency to a shard of their choice that may or may not reference the same public key. This address management scheme also allows the validators, using rules defined in the protocol, to perform merging and division of shards.

Furthermore, a final component that is required is for users to be able to keep track of their addresses over multiple merge and join operations, since unlike conventional blockchains, these can change over time. This can be achieved by the wallet software keeping track of the block when the latest transaction was submitted. Each shard then keeps a record of the merging and splitting operations that have been applied to it over its lifetime. This enables the wallet software to query the original shards where addresses are located to find the location of the address following the first shard splitting or merging event that occurred after the user's last transaction. This can be repeated until the address is matched to its current destination.

Indexing (FIG. 1):
    shard_number: 0, origin: {kind: genesis, block_number: 0}
    shard_number: 1, origin: {kind: genesis, block_number: 0}
Splitting (FIG. 2):
    shard_number: 0, origin: {kind: genesis, block_number: 0},
        daughter: {shard_number 2: block_number 100} shard_number: 1, origin: {kind: genesis, block_number: 0}
shard_number: 2, origin: {kind: duplication, block_number: 100, parent: 0},
Merging (FIG. 3):
shard_number: 0, origin: {kind: merging, block_number: 100,
  parent_a: {shard_number: 0, origin: {kind: genesis, block_number: 0}}
  parent_b: {shard_number: 1, origin: {kind: genesis, block_number: 0}}
}}

Optionally, the wallet software may compute the probabilities of being assigned to particular shards during splitting operations to decrease the average number of queries that are needed. Furthermore, off-chain solutions could be used to provide address mapping services. Moreover, brute force querying of all shards could be used if this is more efficient or if the affected shard has been removed during a merge.

The present disclosure proposes a transaction pricing mechanism for optimizing transaction throughput in sharded blockchains, herein below. This assumes that agents can choose to transact using funds from any shard that contains an address that they control. The above indexing scheme provides a time and space-efficient mechanism to fulfil this function.

The system is configured to employ a pricing mechanism for specifying transaction costs that incentivizes user worker nodes to submit transactions that are restricted to a single shard, thereby maximising system throughput. It will be appreciated that one of the key advantages of sharding is the potential to increase transaction throughput in blockchains. State sharding, which involves partitioning databases into disjoint groups of variables, allows for execution of transactions (which modify variables within a particular shard) in parallel with each other. For a sharded blockchain to be fully functional, it is necessary that there also be a mechanism to allow communication between the different shards. This can be achieved by cross-shard transactions that modify variables from two or more of the disjoint databases simultaneously. However, these types of transactions have significant overhead compared with single-shard transactions and should therefore be disincentivized. Specifically, multi-shard transactions impose the following externalities on the ledger:

(a) They involve an additional networking cost as the pre- and post-execution state information must be communicated between the two shards.
(b) The state changes also require that the execution of these multi-shard transactions to be synchronized, which blocks execution on both shards.
(c) Coordinating the execution of a large number of multi-shard transactions is a computationally demanding problem.

This present disclosure uses the data structures and cryptographic primitives described herein previously to ensure that addresses are organized for maximal throughput.

Notably, transaction throughput refers to the number of transactions that can be processed by the ledger in a given amount of time. In standard blockchains, the transaction throughput is determined by the rate at which miners or validators can produce blocks and the number of transactions that each block can contain. Sharding has the potential to further multiply this number by the number of shards in each block. However, it is slightly more complicated than this due to two main factors: (i) cross-shard transactions effectively block another transaction from using one of the shards and (ii) maximal throughput depends on the transactions being equally distributed among the shards. Proposed is a shard efficiency measure to capture both of these effects as explained in FIG. 4 as well.

Consider a pool (P) of transactions, each of which can use any combination of m shards. The usage $u_s(P)$ of a given shard is defined as number of transactions in the pool that use that shard $|P_s|$ divided by the sum of the cardinality (number of shards in a transaction $s_T$) over all transactions in the pool:

$$u_s(P) := \frac{|P_s|}{\sum_{T \in P} s_T}$$

Next, the congestion cs(P) of a given shard is defined as the maximum of zero and $u_s(P)-1/m$. Total congestion C(P) is then the sum of all the shard congestion values. The shard efficiency of the transaction pool P is given by $F_P:=(1-C(P))/s$, where s is the mean cardinality of all transactions. In FIG. 1, high cardinality and congestion cause the shard efficiency in the left and middle blocks to be ½, whereas the ideal case in the right block has a shard efficiency of 1.

The pricing mechanism proposed herein maximizes transaction throughput by incentivizing agents to maximize the shard efficiency of each transaction. The transaction price is given by $$f(T, P) := p_0(T) + \left(1 - \frac{1 - c(T)}{s(T)^\alpha}\right)\phi,$$

where the variables and parameters are defined as s(T) is the number of shards used in transaction T; c(T) is the sum of congestion values for all shards used in transaction T; $p_0(T)$ is the nominal price of a transaction (accounting for other factors such as computation and state storage costs, wherein the meaning of costs have been defined above and as a consequence, the units of pricing, may be, but are not necessarily monetary in the present context); α is power-law cost to account for additional externalities imposed by multi-shard transactions, such as communication, synchronisation, and the computational complexity of packing them into blocks; ϕ is a free parameter that defines the maximum added price for throughput maximization.

The actual throughput of a decentralized ledger is complex to model in practice because it depends on various quantities including individual preferences and decisions by diverse users. However if it is assumed for the purposes of analysis that transaction rates are uniform across the network and that expected cardinality relates directly to the probability that agents request transactions from each other in the same shard, then the strong result that the pricing function (1) induces a potential game for the agents interacting on the ledger is obtained, where the potential function is the total shard efficiency. This means that the agent incentives are fully aligned with the goal of maximizing shard efficiency, and thus throughput, in the ledger.

Optionally, the congestion is described in terms of a discrete number of "execution slots" within a block but this could also be modified to account for the variable time the execution of a transaction takes to complete, which arises in blockchains with complex state modification rules such as Turing-complete smart contract languages.

Hereinafter, the present disclosure describes a strategy that constitutes a best response for agents under the pricing scheme described previously.

The system is configured to adopt algorithms specifying internal logic for wallet software that access shards so as to minimise their transaction costs. Given the transaction pricing policy, the problem remains how agents should act in order to minimize the price of their current and future transactions. The relevant choices by the agents are in which shards to request and send transactions. This motivates some analysis in order to pose the problem in mathematical terms. Suppose that whenever agent i requests a transaction from agent j, it does so according to a probability distribution $w_{ij}=(w_{ij1}, \ldots, w_{ijm})^T$, in which the elements are all positive and sum to one. Under the assumptions stated in the previous section, the shard efficiency when agent i requests in lane p and agent j requests in lane q is $(1-c_p(P)-c_q(P))/2$ when $p \neq q$ and $1-c_p(P)$ when $p=q$. The expected shard efficiency of transactions between agents is therefore given by:

$$E[F_\rho(T)] = w_{ij}^T P w_{ji} = [w_{ij1} \ w_{ij2} \ \ldots \ w_{ijm}] \begin{bmatrix} 1-c_1 & \frac{1-c_1-c_2}{2^\alpha} & \cdots & \frac{1-c_1-c_m}{2^\alpha} \\ \frac{1-c_1-c_2}{2^\alpha} & 1-c_2 & \cdots & \frac{1-c_2-c_m}{2^\alpha} \\ \vdots & \vdots & \ddots & \vdots \\ \frac{1-c_1-c_m}{2^\alpha} & \frac{1-c_2-c_m}{2^\alpha} & \cdots & 1-c_m \end{bmatrix} \begin{bmatrix} w_{ji1} \\ w_{ji2} \\ \vdots \\ w_{jim} \end{bmatrix}.$$

where the parameter $\alpha$ is tuned to account for discrepancies between estimated and actual transaction cardinality. The best decision for agents is to choose lanes to minimize the price, which is equivalent to maximizing the shard efficiency. If agents can use mixed strategies (randomly choose strategies according to a probability distribution), the best response is the following:

$$w_{ij}^* := \arg \max_{w_{ij} \in \Delta_m} w_{ij}^T P w_{ji}$$

where $\Delta_m$ is the m-dimensional probability simplex, i.e. the space of all mixed strategies. This optimization is readily solved via linear programming. If agents deterministically choose the best strategy, then the best response in pure strategies is an elementary vector $e_l$(vector of all zeros except for entry l, which is equal to one), given by the even simpler optimization problem:

$$w_{ij}^* := e_{l^*}, \text{ where } l^* = \arg \max_{l \in \mathcal{L}} P_l w_{ji}$$

Potential games have the property that as long as agents choose a strategy that improves their outcome when possible, the system as a whole will converge to a state where no further improvement is possible, which is called a Nash equilibrium. Therefore, regardless of whether agents choose pure or mixed strategy best-responses, the network will converge to one such Nash equilibrium under the assumptions stated in the previous section.

Since any given agent i will generally not have access to the exact request distributions $w_{ji}$ of a transacting agent j, agent i can approximate this with an empirical distribution based on the histogram of shards in which transactions have been requested by agent j in the past. This is known as fictitious play in game theory and is known to converge to a Nash equilibrium in potential games.

Hereinafter, the present disclosure provides a set of algorithms that validators can use to perform the shard division operation. These algorithms use address malleability in order to maximize parallelism and thereby throughput. The combination of the pricing scheme, best-responding agent strategy and shard division enable the blockchain to act as a decentralized system that self-organizes to optimize throughput.

The system is configured to execute procedures for reorganizing state databases when shards are duplicated or merged so that subsequent transactions can be maximally executed in parallel. The present disclosure has provided a framework by which a sharded blockchain ledger can maximize transaction throughput via self-organization among the agents. Under ideal conditions, the system will converge to a state in which each transaction occurs on a single shard and the transactions are evenly distributed among the shards. However, it is always possible that extreme conditions can attract activity on a particular contract, for example, and result in high congestion on one or a small number of shards. Provided is a complementary mechanism for maximizing efficiency, which can be used to mitigate performance degradation under such conditions, or simply to boost performance under normal conditions.

The main idea is that when any shard reaches a predefined congestion threshold, it splits into two new shards, and the ledger reassigns public keys to agents in order to minimize cross-shard transactions while producing shards of roughly the same size. This task is well-suited to the concept of balanced graph-partitioning, which involves cutting a graph into pieces of almost the same size while optimizing a cost function on the resulting partition. Since shard efficiency captures exactly the relevant criterion for optimization, it is chosen as the cost function for the partitioning algorithm, computed from the estimated transaction weights $w_{ijs}$ based on recent transaction history on the shard to be split. Let S denote the set of addresses contained in the shard. The present disclosure seeks to split S (containing the edges $\mathcal{E}_S$) into $S_a$ and $S_b$ such that the following cost function is minimized:

$$J(S_a, S_b) := -\sum_{(i,j) \in \mathcal{E}_S} [w_{ija} \ w_{ijb}] \begin{bmatrix} 1-c_a & \frac{1-c_a-c_a}{2^\alpha} \\ \frac{1-c_a-c_b}{2^\alpha} & 1-c_b \end{bmatrix} \begin{bmatrix} w_{ija} \\ w_{ijb} \end{bmatrix} + k(|S_a|^\gamma + |S_b|^\gamma),$$

where k and $\gamma$ are free parameters used to weight shard size balance relative to the expected number of cross-shard transactions, and one of the values of $w_{ija}$ and $w_{ijb}$ is set to the estimated shard weight depending on the partition being evaluated:

$$w_{ij*} := \begin{cases} w_{ijs}, & \text{if } s \in S_* \\ 0, & \text{otherwise} \end{cases}, \text{ for } * \in \{a, b\}$$

There are several efficient implementations of balanced graph partitioning, including spectral, multi-level, and streaming methods. Since the algorithm should be run on every validator and give exact deterministic results, usage of the fast streaming method by Tsourakais et al is proposed. This algorithm has demonstrated excellent performance on networks with billions of nodes despite its simple and deterministic implementation, which is adapted to the shard-splitting context as follows.

Initialize two empty shards $S_a$ and $S_b$
For each address in the sorted address list associated with the shard S to be split:
Add the address to the shard that results in the minimum value of $J(S_a, S_b, \in_{ab})$ Furthermore, a similar approach could also be used to determine optimal shard merge operations, but this problem has different properties. For merge operations, it is straightforward to measure the utility function before and after the merge, but the difficulty lies in choosing which shards should be merged.

In this case there are three possibilities:
a) Greedy: pick the two smallest shards in the ledger.
b) Pair-wise: perform merges on all pairs and merge the pair that gives greatest improvement in the objective function.
c) Combinatorial: higher-order (3 or more) combinations of shards.

Optionally, the partitioning algorithm described above could also be augmented to include other properties that increase the utility of derived chains including size of state database, number of elements in state database, some "social" property of the network such as votes for a particular policy, membership of a particular organization or to enable hard-forking of the protocol.

DETAILED DESCRIPTION OF THE DRAWINGS

Referring to FIG. 1, there is shown a block diagram illustrating a shard indexing scheme, wherein mapping of a single public key to different addresses on the same shard and/or a different shard is executed. Notably, the shard index is identical for all elements that are stored in the shard and does not need to be stored explicitly for each element. Similarly, the account index generally zero for most addresses in the shard can be omitted to reduce storage requirements.

Referring to FIG. 2, there is shown a block diagram illustrating a shard division scheme, wherein division of a shard 0 comprising addresses (a) and (b), wherein addresses (a) and (b) can be moved to different shards. In an example, previously stored addresses (a) and (b) of shard 0 as depicted in FIG. 1 are stored in two different shards, namely shard 0 and shard 2. Notably, the change of shard index results in a change in the hash/address of account (b). Moreover, entire state (of said address) is preserved. It is possible that neither address would be moved following shard duplication in which case neither of the addresses would be altered. Shard 1 and all addresses associated with it (including address (c) from FIG. 1) are unchanged by the split of shard 0.

Referring to FIG. 3, there is shown a block diagram illustrating a shard merging scheme, wherein the merging of shards 0 and 1 takes place. Notably, addresses (a) and (b) remain unchanged. However, address (c) is modified to prevent conflict with address (b). Said modification is achieved by incrementing its account index variable. Herein, said procedure ensures that entire state is preserved during both divide and merge operations.

Figure 4:
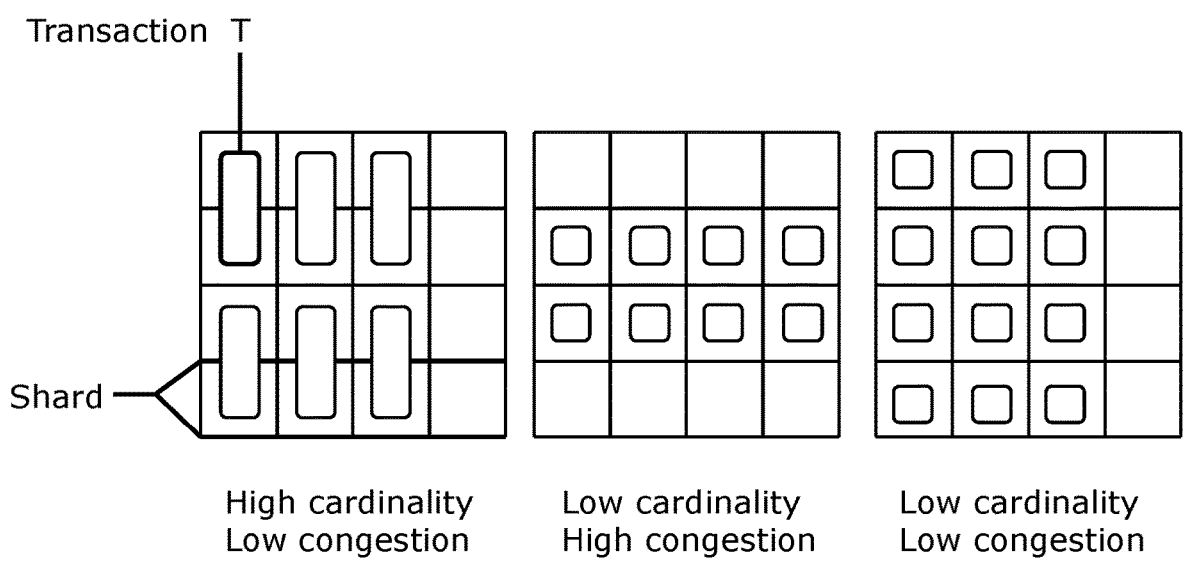
FIG. 4 is a block diagram illustrating pricing mechanism for maximizing throughput, in accordance with an embodiment of the present disclosure.

Referring to FIG. 4, there is a block diagram illustrating pricing mechanism for maximizing throughput, wherein cardinality and congestion affect transaction throughput in a distributed ledger arrangement/blockchain ledger. Notably, rows represent shards and columns or slices in the block, comprising at most one transaction per shard. Further, transactions are shown as tiles occupying one or more shards in the block. Furthermore, the number of transactions is maximized when both cardinality and congestion are minimized. In other words, allowing the maximum number of transactions to be processed.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A distributed computer system comprising at least one processor and including a plurality of worker nodes that are coupled together via a data communication network to exchange data therebetween, wherein the plurality of worker nodes is configured to process data therein, wherein operation of the distributed computer system is coordinated by employing a distributed ledger arrangement, wherein the distributed computer system is configured to execute at least one smart contract via use of the distributed ledger arrangement, wherein the distributed computer system further comprises
a scheme for mapping cryptographic keys to a specific shard in the distributed ledger arrangement such that the scheme can be modified by a user worker node and/or an operator worker node of the distributed ledger arrangement; a pricing mechanism, for specifying a transaction cost, such that it maximizes system throughput by incentivizing user worker nodes to submit transactions that are restricted to a single shard, algorithms for specifying internal logic for wallet software that accesses shards such that the transaction cost is minimized; and
wherein the distributed computer system is configured to execute procedures for reorganizing state databases when shards are duplicated or merged, such that subsequent transactions are maximally executed in parallel.

2. The distributed computer system of claim 1, wherein, for each shard, the scheme for mapping cryptographic keys is configured to employ an index that maps a public key to a specific shard and to employ an account index that allows a single public key to map to different addresses within a same shard.

3. The distributed computer system of claim 2, wherein the system further comprises a wallet software configured to track changes within a block when a transaction is submitted, wherein each of the shards keeps a record of the merging and splitting operations that have been applied to it.

4. The distributed computer system of claim 3, wherein the wallet software is configured to compute probabilities of transactions being assigned to particular shards during splitting operations to decrease the average number of queries that are required.

5. The distributed computer system of claim 2, wherein the system is configured to provide a permission to validators of the distributed ledger arrangement to modify account indices.

6. The distributed computer system of claim 1, wherein the system is configured to arrange for optimal distribution of transactions between shards such that cross-shard transaction is disincentivized.

7. The distributed computer system of claim 1, wherein each of the shards have a predefined congestion threshold, wherein the system is configured to split a given shard into two new shards when the given shard reaches the predefined congestion threshold.

8. A method for operating a distributed computer system that includes a plurality of worker nodes that are coupled together via a data communication network to exchange data therebetween, wherein the worker nodes are configured to process data therein, wherein operation of the distributed computer system is coordinated by employing a distributed ledger arrangement, wherein the distributed computer system is arranged to execute at least one smart contract via use of the distributed ledger arrangement, characterized in that the method includes
- (a) implementing a scheme for mapping cryptographic keys to a specific shard in the distributed ledger arrangement that can be modified by a user worker node and/or an operator worker node of the distributed ledger arrangement;
- (b) employing a pricing mechanism for specifying transaction computing cost that incentivizes user worker nodes to submit transactions that are restricted to a single shard, thereby maximizing system throughput;
- (c) adopting algorithms specifying internal logic for wallet software that access shards such that their transaction computing cost is minimized; and
- (d) executing procedures for reorganizing state databases when shards are duplicated or merged so that subsequent transactions can be maximally executed in parallel.

9. The method of claim 8, wherein method comprises employing an index that maps a public key to a specific shard and employing an account index that allows a single public key to map to different addresses within a same shard.

10. The method of claim 9, wherein the method comprises employing a wallet software configured to keep track of a block when the latest transaction was submitted, wherein each of the shards keeps a record of the merging and splitting operations that have been applied to it.

11. The method of claim 9, wherein the method comprises providing a permission to modify account indices to validators of the distributed ledger arrangement.

12. The method of claim 10, wherein the method comprises arranging for the wallet software to compute probabilities of transactions being assigned to particular shards during splitting operations to decrease the average number of queries that are required.

13. The method of claim 8, wherein the method comprises disincentivizing cross-shard transaction and arranging for optimal distribution of transactions between shards.

14. The method of claim 8, wherein each of the shards have a predefined congestion threshold, wherein a given shard splits into two new shards when the given shard reaches the predefined congestion threshold.

15. A non-transitory machine-readable data storage media storing computer instructions executable upon computing hardware for implementing a method of claim 8.

* * * * *